(12) United States Patent
Lecerf et al.

(10) Patent No.: US 8,194,077 B2
(45) Date of Patent: *Jun. 5, 2012

(54) ADAPTIVE GRAND TOUR

(75) Inventors: Loic M. Lecerf, Biviers (FR); Guillaume M. Bouchard, Saint-Martin-le-Vinoux (FR)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,593

(22) Filed: Jan. 18, 2012

(65) Prior Publication Data

US 2012/0113124 A1     May 10, 2012

Related U.S. Application Data

(63) Continuation of application No. 12/364,885, filed on Feb. 3, 2009.

(51) Int. Cl.
*G06T 11/40* (2006.01)
(52) U.S. Cl. ....................................... 345/442
(58) Field of Classification Search ............... 345/442
See application file for complete search history.

(56) References Cited

U.S. PATENT DOCUMENTS

| | | | |
|---|---|---|---|
| 5,224,058 A | 6/1993 | Mickaels et al. |
| 6,100,901 A | 8/2000 | Mohda et al. |
| 6,366,299 B1 | 4/2002 | Lanning et al. |
| 6,571,251 B1 | 5/2003 | Koski et al. |
| 7,167,856 B2 | 1/2007 | Lawder |
| 7,265,755 B2 | 9/2007 | Peterson |
| 7,557,805 B2 | 7/2009 | Wong et al. |
| 2001/0029506 A1 | 10/2001 | Lee et al. |
| 2002/0138233 A1 | 9/2002 | Chretinat |
| 2003/0030637 A1 | 2/2003 | Grinstein et al. |
| 2006/0165211 A1 | 7/2006 | Goto et al. |
| 2007/0087756 A1 | 4/2007 | Hoffberg |
| 2008/0015448 A1 | 1/2008 | Keely et al. |
| 2008/0040077 A1 | 2/2008 | Dean |
| 2009/0063557 A1 | 3/2009 | MacPherson |
| 2009/0252404 A1 | 10/2009 | Lecerf |
| 2010/0177164 A1 | 7/2010 | Zalevsky et al. |
| 2010/0185422 A1 | 7/2010 | Hoversten |

OTHER PUBLICATIONS

Asimov, *The Grant Tour: A Tool for Viewing Multidimensional Data*, dated Sep. 1983, SIAM Journal on Scientific and Statistical Computing, 6(1):128-143.

Avidan, et al. *Seam Carving for Content-Aware Image Resizing*, Proc. of the 2007 SIGGRAPH Conf., ACM Transactions on Graphics (TOG), vol. 26, Issue 3, Jul. 2007, pp. 1-9.

Buja, et al. *Theory and Computational Methods for Dynamic Projections in High-Dimensional Data Visualization*, Journal of Computational and Graphical Statistics, 1997, pp. 1-67.

Bishop, et al. *GTM: The Generative Topographic Mapping*, 1998, Neural Computation, 10(1):215-234.

Chen, et al. *iVIBRATE: Interactive Visualization-Based Framework for Clustering Large Datasets*, 2006, ACM Trans. Inf. Syst. 24(2): 245-294.

(Continued)

*Primary Examiner* — Javid A Amini
(74) *Attorney, Agent, or Firm* — Fay Sharpe LLP (57) ABSTRACT

A system and method of generating a dynamic visualization of a multi-dimensional dataset of data-points are disclosed. The method is an adaptation of the Grand Tour approach, but instead of using all possible projections comprising at least one data point, some of which may not be useful, the method includes generating a set of candidate projections from the space of all possible projections. The set of candidate projections is approximated with a one dimensional smoothed curve and the dynamic visualization is generated, based on a sequence of projections taken along the smoothed curve.

26 Claims, 6 Drawing Sheets

OTHER PUBLICATIONS

Cook, et al. Grand Tour and Projection Pursuit, Journal of Computational and Graphical Studies, 1995, vol. 4, pp. 155-172.

Cutzu, et al. *Estimating the Photorealism of Images: Distinguishing Paintings from Photographs, In Proc. of the IEEE Conf. on Computer Vision and Pattern Recognition*, Jun. 18-20, 2003, pp. 1-8.

Dos Santos. *A Framework for the Visualization of Multi-dimensional and multi-variate data*, PhD Thesis, Chapter 3, 2004, pp. 1-22.

Faith, et al. *Targeted Projection Pursuit for Interactive Exploration of High-Dimensional Data Sets*, in IV'07: Proc. of the 11$^{th}$ Intl. Conf. Information Visualization, IEEE Computer Society, 2007, pp. 286-292.

Friedman, et al. A projection pursuit algorithm for exploratory data analysis, IEEE Tansactions on Computers, 1974, pp. 881-890.

Kandogan. *Visualizing Multi-Dimensional Clusters, Trends, and Outliers Using Star coordinates*, KDD'OI: Proc. 7$^{th}$ ACM SIGKDD Intern, Conf. on Knowledge Discovery and Data Mining, 2001, ACM Press, pp. 107-116.

Kohonen. *Self-Organizing Maps*, Chapter 8, 1995, pp. 1-10.

Kreuseler, et al. *Information visualization using a new Focus+Context Technique in combination with dynamic clustering of information space*, ACM 2000, pp. 1-5.

Mahalanobis. On the Generalized Distance in Statistics, Proc. of the National Institute of Sciences of India, 1936, 2(1):49-55.

Swayne, et al. *Exploratory data analysis using interactive dynamic graphics*, 3$^{rd}$ Intl. Conf. on Knowledge Discovery & Data Mining, Aug. 14, 1997, pp. T4-1, T4-4-T4-32.

Utsugi. *Hyperparameter Selection for Self-Organizing Maps*. Neural Computation 9, 3, 1997, pp. 623-635.

Wong, et al. Dynamic Visualization of Transient Data Streams, IEEE Symposium on Information Visualization, 2003, Oct. 19-21, 2003.

Zhang, et al. $L_1$ *Regularized Projection Pursuit for Additive Model Learning*, 2008, IEEE, pp. 1-8.

ADAPTIVE GRAND TOUR

This application claims the benefit, as a continuation of U.S. application Ser. No. 12/364,885, filed Feb. 3, 2009, now U.S. Pat. No. 8,159,493, issued Apr. 17, 2012, the disclosure of which is incorporated herein by reference in its entirety.

BACKGROUND

The exemplary embodiment relates to a method and system for the display of multi-dimensional data. It finds particular application in connection with dynamically determining and presenting appearance and spatial attribute values of entities of the multi-dimensional data over a sequence to assist in the recognition of patterns and trends within the data.

Data visualization and analysis is a difficult task when the dimensionality of data is high and the shape of clusters is complex. Recently, a number of data visualization methods have been proposed. Most of the methods are only applicable to a simple dataset, for example smooth manifolds or clustered data-points. Standard data analysis tools use mathematical operations to reduce the dimensionality of the data to a more manageable dimensionality (e.g., multidimensional scaling (MDS), principal component analysis (PCA), cluster analysis, projection pursuit methods, neural network algorithms, and the like) or for transforming data for visualization. These methods provide a static view of the data, which is efficient for a simple dataset.

In some cases involving large, noisy or non-linear datasets, static visualization methods are not able to give an intuitive understanding of the spatial organization of the data. One approach is to use a dynamic visualization method, that is to say a system that outputs an animation consisting of a series of smoothly changing projections of a data-point cloud that encompasses all data-points. With such settings, visualization is similar to watching a movie, and thus makes use of time as an additional dimension. However, this dimension is very specific and requires a dedicated method to be really understood by users. A standard method for dynamic visualization is known as the Grand Tour. In the Grand Tour, sequences of 2D or 3D projections are displayed (See, ASIMOV, D. The grand tour; a tool for viewing multidimensional data. SIAM. Journal of Science and Statistical Computing, 6(1):128-143, January 1985). Instead of choosing an arbitrary projection to visualize the data, every possible projection is approximately visualized using multiple images in a movie-like animation. A space-filling curve is used in traversing the projection space, i.e., a series of projections for which, for every possible projection, the series contains at least one element in a small neighborhood, and the sequence of projections is smooth, so that two contiguous projections in the series give similar images. In the classical implementation, a step and space-filling curve are defined, a plane is moved along this curve and the data projected. The user browses the animation using the time dimension scale by which the projections are indexed.

The series of projections in the Grand Tour does not depend on the data being visualized. However, viewing the huge space of 2D projections of a multidimensional dataset as a video can be prohibitively time consuming and not really informative when the number of dimensions is large. As a result, the Grand Tour is generally impractical for more than 10 dimensions.

Other dynamic visualization methods may involve a more an advanced framework that includes interaction with the user.

In order to reduce the huge search space for projection visualization, a projection pursuit guided tour has been proposed which combines Grand Tour and projection pursuit (See COOK, D., BUJA, A., CABRERA, J., AND HURLEY, H. Grand tour and projection pursuit, J. of Computational and Graphical Statistics 4, pp. 155-172 (1995)). The method of projection pursuit finds the projections that optimize a criterion called the projection pursuit index. This criterion should reveal the most details about the structure (clusters, surfaces, etc.) of the dataset (See FRIEDMAN, J., AND TUKEY, J. A projection pursuit algorithm for exploratory data analysis. In *IEEE Transactions on Computers*, pp. 881-890 (1974)). This combination is a useful visualization tool for some applications but does not allow a user to participate in the process.

Interaction techniques can empower the user's perception of information. A set of interaction techniques, such as aggregation, rotation, linking and brushing, interactive selection, and the like may improve the visualization process (See, DOS SANTOS, S. R., *A framework for the visualization of multi-dimensional and multivariate data*. Ph.D. Dissertation, University of Leeds, United Kingdom (2004)).

One approach uses the VISTA framework (CHEN, K., AND LIU, L. ivibrate: Interactive visualization-based framework for clustering large datasets. *ACM Trans. Inf. Syst.* 24, 2, pp. 245-294 (2006)). VISTA uses a star coordinates representation to manipulate dimensions available in the 2D view. (See, KANDOGAN, E. Visualizing multi-dimensional clusters, trends, and outliers using star coordinates. In *KDD'OI: Proc. 7th ACM SIGKDD Intern, Conference on Knowledge Discovery and Data Mining* pp. 107-116 (ACM Press, New York, N.Y., USA, 2001). This permits user interaction. However manipulating the parameters of the projection is not an intuitive way to explore the dataset and it is difficult when dimensionality is high.

Another approach is known as Targeted Projection Pursuit (TPP) (See, FAITH, J. Targeted projection pursuit for interactive exploration of high-dimensional data sets. In *IV '07: Proceedings of the 11th International Conference Information Visualization*, IEEE Computer Society, pp. 286-292 (Washington D.C., 2007) Unlike VISTA, The basis of TPP is that the user manipulates their view of the data directly, rather than manipulating the projection that produces that view. TPP is an interactive exploration tool where the user defines a target, and the system finds a projection that best approximates that target.

Both of these alternatives to the Grand Tour approach are relatively complex and require a highly trained user.

INCORPORATION BY REFERENCE

U.S. Pat. No. 7,265,755 issued Sep. 4, 2007, entitled METHOD AND SYSTEM FOR DYNAMIC VISUALIZATION OF MULTI-DIMENSIONAL DATA, by Peterson, discloses a method in a computer system for automatically presenting a dynamic visualization of data in a multi-dimensional space of greater than three dimensions, the data having a plurality of attributes. The method includes receiving a plurality of mappings of data attributes to visualization dimensions, wherein the visualization dimensions include at least one appearance dimension, a plurality of spatial dimensions, and at least one sequencing dimension, determining a plurality of data entities from the data, each data entity associated with a portion of the data, and for each determined data entity, at a time of visualization of the data, automatically and dynamically generating a series of representations of the data entity in the multi-dimensional space and automatically and dynamically presenting the generated series of representations, the representations based upon values of each of the data attributes of the data associated with the data entity that have been mapped to the appearance, spatial, and sequencing dimensions, to portray changes in the data entity over values of the sequencing dimension so that trends in the data can be identified.

U.S. Pat. No. 6,100,901, issued Aug. 8, 2000, entitled METHOD AND APPARATUS FOR CLUSTER EXPLORATION AND VISUALIZATION, by Mohda, et al., discloses a method and apparatus for visualizing a multi-dimensional data set in which the multi-dimensional data set is clustered into k clusters, w, each cluster having a centroid. One of two distinct current centroids and three distinct non-collinear current centroids is selected. A current 2-dimensional cluster projection is generated, based on the selected current centroids. Two distinct target centroids are selected (or three non-collinear target centroids), at least one of which is different from the current centroids. An intermediate 2-dimensional cluster projection is generated, based on the current centroids and the target centroids.

BRIEF DESCRIPTION

In accordance with one aspect of the exemplary embodiment, a method of generating a dynamic visualization of a multi-dimensional dataset includes generating a set of candidate projections from the space of all possible projections for a multi-dimensional set of data-points, the set of candidate projections being based on the multi-dimensional dataset. Each of the possible projections includes at least one data point. The method further includes approximating the set of candidate projections with a one dimensional smoothed curve and generating the dynamic visualization based on a sequence of projections taken along the smoothed curve.

In another aspect, a computer-implemented method for generating a dynamic visualization of a dataset having three or more than three dimensions includes receiving constraints input by a user, based on the constraints, identifying a set of candidate linear projections for the dataset, approximating the set of candidate linear projections as a smoothed one dimensional curve, and automatically generating a dynamic visualization based on a sequence of projections taken along the smoothed curve.

In another aspect, an automated method for assisting a user in labeling data points of a dataset includes generating a dynamic visualization of a dataset based on a sequence of projections, each projection comprising at least one data-point from the dataset, receiving labels applied by a user to data-points displayed in the dynamic visualization, based on the labels, generating constraints, based on the constraints, identifying a set of candidate linear projections for the dataset, approximating the set of candidate linear projections as a smoothed one dimensional curve, and generating a new dynamic visualization based on a sequence of projections taken along the smoothed curve.

BRIEF DESCRIPTION OF THE DRAWINGS

FIGS. 5 A-F illustrate projections from a sequence of projections generated by the exemplary method on a real dataset (Lymph) using a semi-supervised approach; and FIGS. 6 A-F illustrate projections from a sequence of projections generated by the exemplary method on a the same dataset (Lymph) using a unsupervised approach, demonstrating a difference in the projections which are generated by supervised and unsupervised approaches.

DETAILED DESCRIPTION

Aspects of the exemplary embodiment relate to a system and computer-implemented method for automatically presenting a dynamic visualization of data-points in a multi-dimensional space of typically three or more dimensions. The exemplary method, referred to herein as the Adaptive Grand Tour (AGT), provides a dynamic visualization framework for multidimensional data analysis. One objective of the system is to allow a user to explore the complexity of a dataset by smooth animations of data-points. This kind of data visualization is a natural way to handle complex datasets with high dimensionality and complex shape. A tractable alternative to Grand Tour visualization has been developed and extended to permit the user to guide the smooth animation of data-points according to his specific interests. The exemplary method is based on the extraction of many optimal local 2D projections and the generation of data-point movies with a 1-dimensional Bayesian Self-Organizing Map that finds a fixed-length smooth path through the generated projections. In tests of the relevance of the approach on real and artificial datasets, the method has been shown to enable the management of complex datasets which can benefit from a user's guidance.

In the exemplary method, the Adaptive Grand Tour approach is an adaptation of the Grand Tour approach which improves visualization of high dimensional (possibly infinite-dimensional) datasets, by using the structure of the data. The method assumes that, in general, the effective number of dimensions of a dataset is much lower that the number of features used to describe it. By allowing a user to select the most relevant features (or by automatically selecting projections likely to be interesting), the method is able to target only a subset of the (more relevant) projections that Grand Tour would otherwise explore.

In one embodiment, the method provide an automatic exploration of a dataset, based on the selected features, e.g., as a sequence of projections displayed to a user as a movie. In other embodiments, the method takes into account user feedback during initial exploration to guide subsequent visualizations toward views that are of greater interest to the user. In some aspects, the method makes use of a kernel representation of the data to handle non-linear projections.

An implementation of such a system has been tested on exemplary multidimensional datasets, as described in further detail below. It combines, in a natural way, user interaction and the visualization of an animation. This makes a powerful tool to explore and analyze data, to uncover underlying structure, extract important variables, and detect outliers and anomalies.

The method takes advantage of the exploratory power of Grand Tour visualization and resolves its main drawbacks: exploration of high-dimensional datasets and consideration of the user interest.

Figure 1:
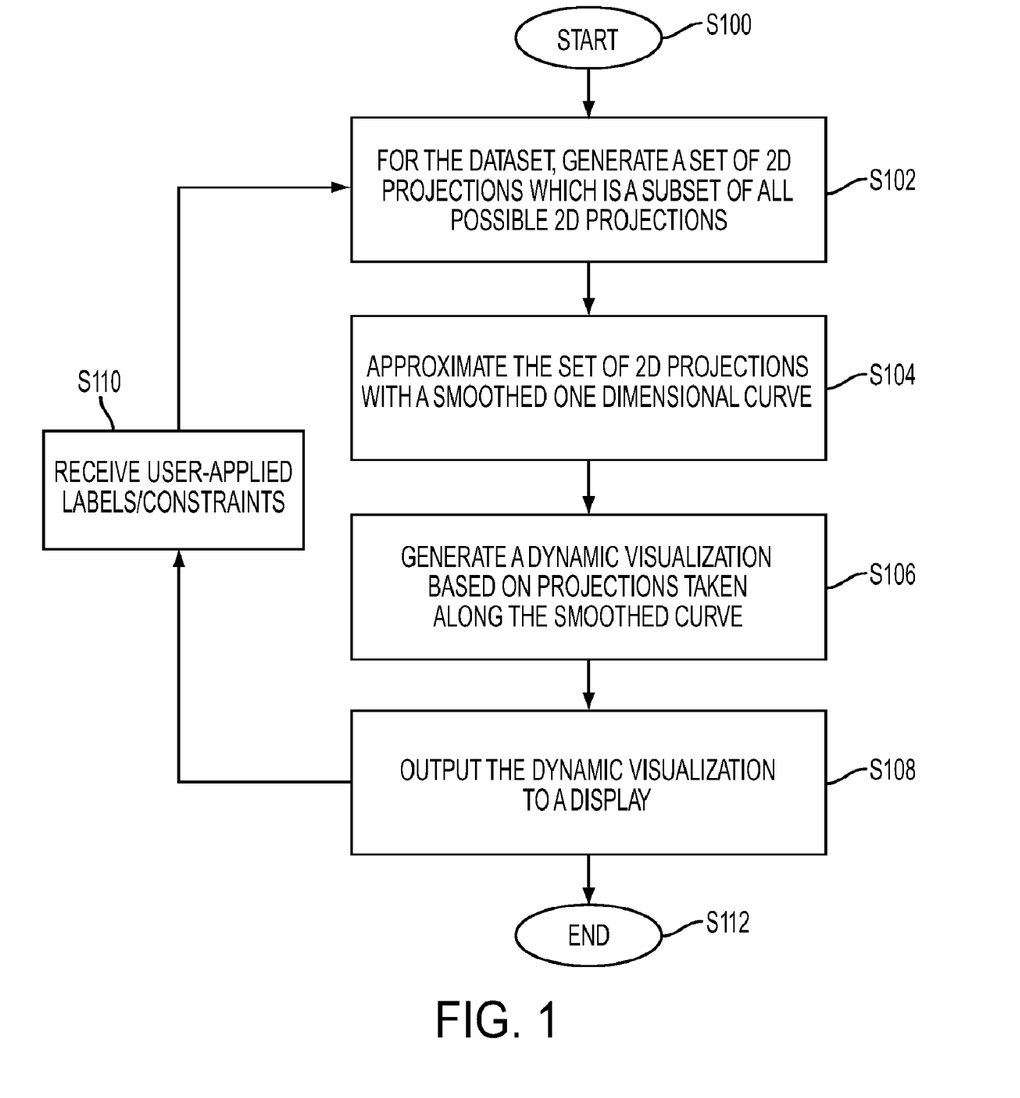
FIG. 1 is a flow diagram illustrating an exemplary Adaptive Grand Tour method for visualizing a multidimensional dataset.
Figure 2:
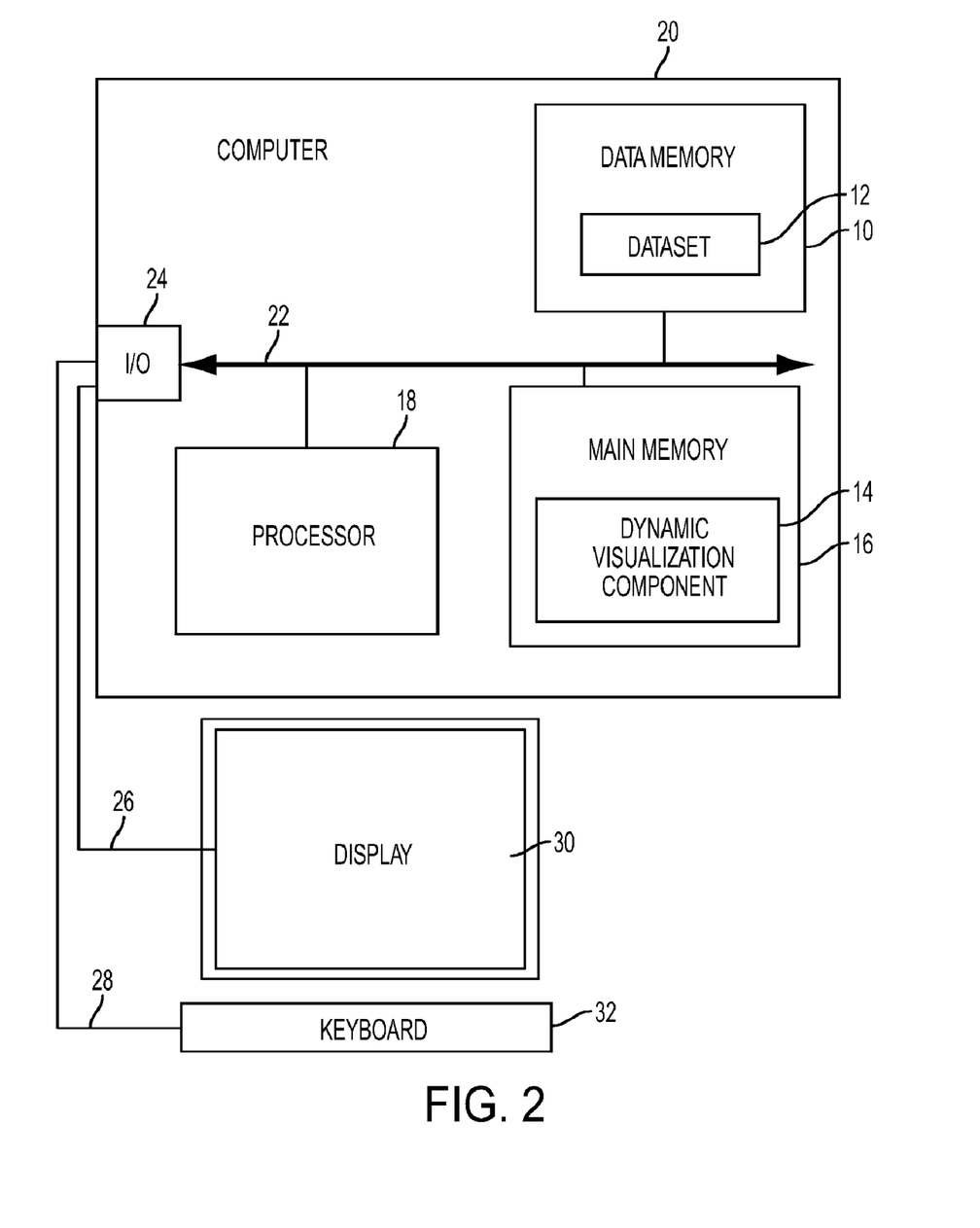
FIG. 2 illustrates an exemplary apparatus for performing the method of FIG. 1.

As with the Grand Tour approach, the exemplary method and system allows a user to visualize a dataset by a smooth animation of 2D projections (or simulated 3D projections). The basic steps of the method are illustrated in FIG. 1, and may be implemented with a computer system, as shown in FIG. 2. The method assumes that a multidimensional data set, e.g., having greater than three dimensions, has been input and stored. The data set, for purposes of illustration, may comprise data-points having a set of features which can be represented by feature values in a number of dimensions. In some embodiments, each data-point may correspond to a record, such as a document, image, thumbnail image, or the like. The record may be linked to the data point and revealed when a user clicks on an active area of the screen corresponding to the data-point or may be displayed automatically when a projection is displayed.

In general the method is applicable to data sets having hundred(s) or even thousands of data-points, although fewer data-points may be considered. The method begins at S100.

At S102, based on the dataset, a finite subset of projections is generated that may be expected to be of interest to the user, e.g., based on user-selected criteria. Each projection may be a linear projection, although non-linear projections are also contemplated. From the set of all possible projections, the finite subset of projections may be generated by automated methods which focus on data-points or groups of data-points likely to be of interest or by using a user-directed selection of features designed to reduce the number of projections to a subset of the possible projections. Each projection includes a set of the data-points (at least one data point) and may be a 2 dimensional projection in which x and y axes represent first and second of the possible dimensions (features) of the data set respectively or a simulated 3D projection where a third dimension is graphically represented.

Figure 3:
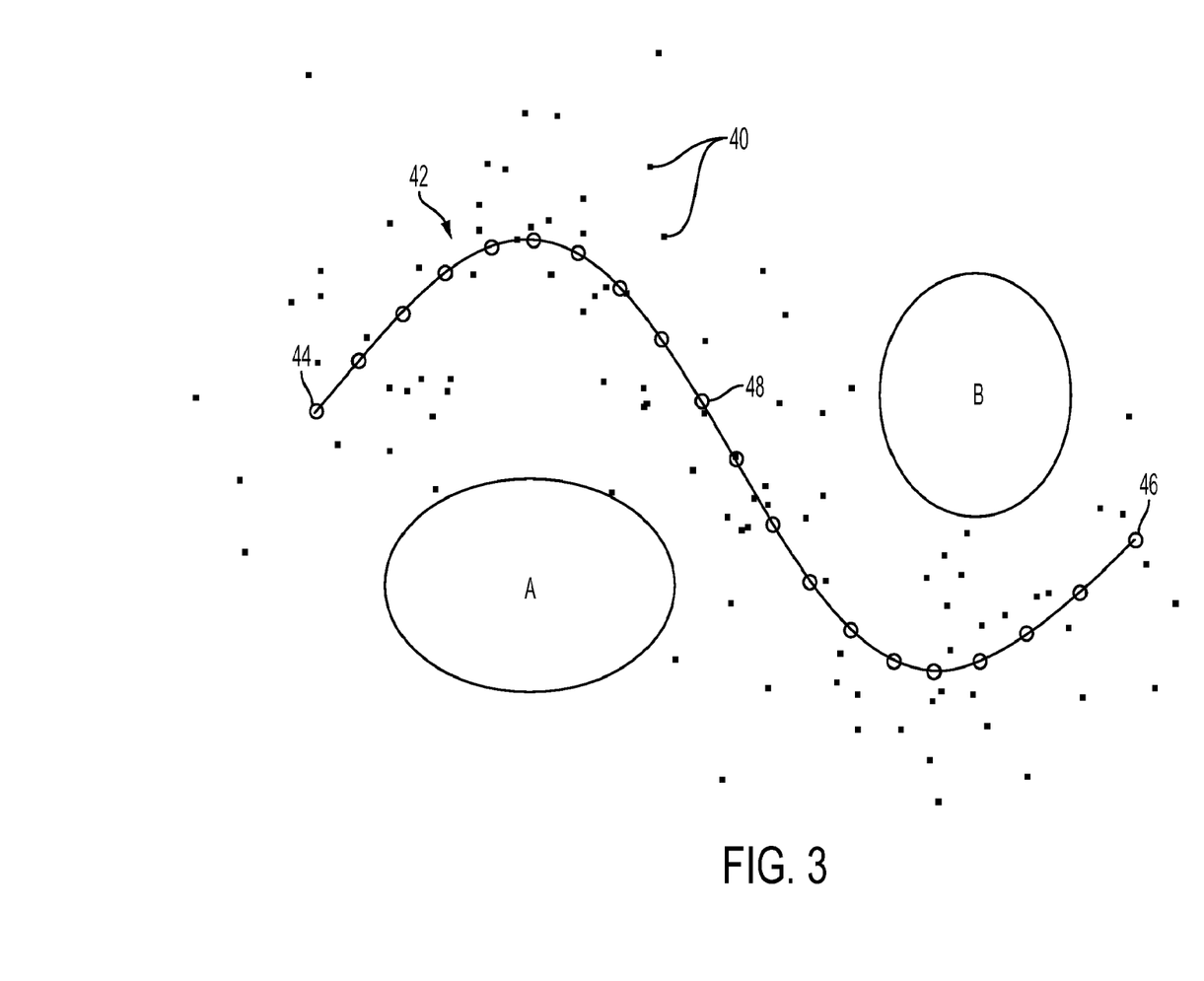
FIG. 3 illustrates a Bayesian Self Organizing map which may be used in the generation of an exemplary smoothed curve during the method of FIG. 1.

At S104, the set of projections generated at S102 is approximated by a 1-dimensional smoothed curve (see, for example, FIG. 3). The approximation may be performed by optimizing an objective function which takes into account two factors: a) the proximity of the data-points to the curve (with the object of bringing the curve as close as possible to the data-points of interest) and b) the smoothness of the curve (which increases as the length of the curve is reduced). For example, a weighting factor may be used to weight the relative influence of a first term of the function related to the proximity of data-points and a second term related to the curve smoothness. As will be appreciated, when the solution of the objective function is obtained through an iterative process, such as expectation maximization, a true optimum may never be achieved and the term "optimization" is intended to cover such cases where the method approaches but does not fully achieve a true optimal value.

At S106, an animation (dynamic visualization) can be assembled using a fixed number of projections taken uniformly of the smoothed curve.

At S108, the animation is displayed to the user.

Optionally, at S110, a user reviewing the animation selects data-points and annotates them with class labels or selects new constraints to add. The method then proceeds to step S102, where the class labels/constraints are automatically used to form constraints on the sampling of projections which are used in identifying a new set of candidate projections from the set of all possible projections.

The method ends at S112.

FIG. 2 illustrates a computer system for implementing the exemplary method. The system includes data memory 10 for storing a data set 12 being processed. A dynamic visualization component (DVC) 14 performs steps S102-S108. The DVC 14 may be implemented as hardware or software or a combination thereof. In the exemplary embodiment, the DVC 14 comprises software instructions, stored in main memory 16. A processor 18, such as the CPU of a computer 20, which hosts the DVC, controls the overall operation of the computer system by execution of processing instructions stored in memory 16. The instructions comprising the DVC 14 are executed by processor 18. Components 10, 16, 18, of the computer system may be connected by a data control bus 22. The computer 20 includes an input/output device 24, which is linked by communication links 26, 28 to one or more of a display 30, such as a computer monitor, and a user input device 32, such as a keyboard, keypad, cursor control device, or touch or writable screen, and/or a cursor control device 26, such as mouse, trackball, or the like, for communicating user input information and command selections to the processor 18, such as annotations for the data-points, constraints, or selection of one of the projections in the sequence for viewing. Links 26, 28 may be wired or wireless communication links and may be direct links or connections through a network, such as a local area network or wide area network, such as the Internet.

As will be appreciated, computer 20 may comprise one or more computing devices, such as a personal computer, PDA, laptop computer, server computer, or combination thereof. Memories 10, 16 may be integral or separate and may represent any type of computer readable medium such as random access memory (RAM), read only memory (ROM), magnetic disk or tape, optical disk, flash memory, or holographic memory. In one embodiment, the memories 10, 16 comprise a combination of random access memory and read only memory. In some embodiments, the processor 18 and memory 10 and/or 14 may be combined in a single chip.

The method illustrated in FIG. 1 may be implemented in a computer program product that may be executed on a computer. The computer program product may be a tangible computer-readable recording medium on which a control program is recorded, such as a disk or hard drive, Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. In other embodiments, the method may be implemented in a transmittable carrier wave in which the control program is embodied as a data signal, e.g., transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 1, can be used to implement the method for generating a dynamic visualization of data in a multi-dimensional space of three or more dimensions as a sequence of images of 2D or 3D projections.

Further details of the system and method are described below.

1. Projections Generation (S102)

The aim of the first step is to sample, from all possible projections comprising at least one data point, a subset of the projections which focus on showing projections containing data-points which are more likely to be of interest to the user. This may be achieved by providing automatically generated constraints to the sampling process, user generated constraints, or a combination thereof.

Assume that the dataset $X \in \Re^{n \times d}$ consists of n data-points $(x_1, x_2, \ldots, x_n)$ where every data-point $x_i \in \Re^d$ can be described by d features, e.g., as a features vector. d thus represents the number of dimensions of the data-point cloud. For simplicity, only linear projections are considered here (see below for non-linear projections). Let β denote the linear projection: β is a d×2 matrix (or d×3 matrix in the case of a 3D representation) and the projected vector is $\Pi(x,\beta)=T_v(\beta)x$, where $T_v$ denotes the transposition operator for a vector. The objective of the first step is to generate a set of N candidate projections $\beta_1, \beta_2, \ldots, \beta_N$ that roughly cover the space of "interesting" projections and which is only a subset of all possible projections B. Two types of approach to generate interesting projections (projections in areas of high user preference) are proposed. The first one is based on linear dimensionality reduction, the second one is based on sampling strategies:

1.1 Generating Projections Using Local Linear Embedding

The standard method to project high dimensional data-points in 2 or 3 dimensions is Principal Component Analysis (PCA). When PCA is applied to data-points and their neighbors only, the method is called Local Linear Embedding (LLE). With this method, for every point, its local neighborhood is identified using a pre-defined distance metric and the linear projection over this neighborhood that minimizes the squared reconstruction error when projecting the points back in the original space. In the present embodiment, three proposals for LLE are described to generate the projections $\beta_1, \beta_2, \ldots, \beta_N$, for unsupervised, supervised, and semi-supervised applications, respectively. For each of these methods, there is one projection associated to every point.

1.1.1 Unsupervised setting In this approach, exactly the same number of projections is generated as the number of data points n. The PCA method is applied on the neighborhood of each of the n available data-points. Each of these projections is used in the next step. Concerning the neighborhood, it is limited to the K closest data-points, as determined by a distance metric. The diversity of the possible projections depends on the size of the neighborhood K. Note that if K=n−1 were to be selected, all the data-points are neighbors to each other so that the n projections are the same and equal to the PCA solution on the full dataset. In an exemplary embodiment, K≦n/4 for example, 10≦K≦100. For moderate values of K (e.g., K=20), the computed projections can be useful for visualizing the local relative positions of similar data-points.

1.1.2 Supervised setting When data-points are already labeled, it may be helpful to take this information into account when computing the candidate projections. A K—neighborhood may still be used, but PCA can be used on the class mean vectors instead of the original data-point. Also, as for the Fisher Linear Discriminant (FLD) method, the Mahalanobis distance can be used to compute the principal component (see Mahalanobis, P. C. "On the generalised distance in statistics". *Proceedings of the National Institute of Sciences of India* 2 (1): 49-55 (1936)). For large neighborhoods, the method is equivalent to the standard FLD.

1.1.3 Semi-supervised setting In practice, few points are labeled, especially in the interactive setting presented in section 4.1 below. A tradeoff can be defined between the unsupervised and the supervised approach by considering that every unlabelled point is in a separate class and then apply the local FLD method described for the supervised setting.

1.2 Generating Projections by Sampling Random Projections

A set of L constraints $C=\{c_1, \ldots, c_L\}$ given by the user is defined. Projections are then selected automatically, based on these constraints. Every constraint $c_l$, l=1, ..., L is a function from $\Re^{n \times 2}$ (a given 2D projection of the data-points) to [0,1]. If $c_l(z)=1$, where z is a candidate projection in $\Re^{n \times 2}$, then the projection z is valid for the $l^{th}$ constraint is satisfied. On the other hand, the value $c_l(z)=0$ means that the constraint is not satisfied: this projection is not considered valid. For example, a user may define a proximity constraint: two given points should have a projection that is no more than a pre-specified distance. A value of $c_l$ between 0 and 1 can be interpreted as the degree of acceptance for the constraint.

The exemplary method aims to sample more frequently those projections for which the degree of acceptance is highest and less frequently those projections where the degree of acceptance is lowest.

N different candidate projections $\beta_1, \ldots, \beta_N$ are then sampled, such that the visualization of the projected data satisfies the user constraints and gives a good overview of the structure of the data.

Formally, let S be the set of projections satisfying the constraints: $S=\{\beta \in B; \Pi_{l=1}^{L} c_l(\Pi(X,\beta)) > 0\}$. If only hard constraints are set, the distribution Q is the uniform law over S, that is to say the probability of occurrence under Q of a point in an subset s of S is proportional to $$\frac{|s|}{|S|}$$

where |s| denotes the cardinality of the set s and |S| denotes the cardinality of the set S. If the user chooses soft constraints, the distribution Q is proportional to $\Pi_{l=1}^{L} c_l(\Pi(X,\beta))$.

Exemplary sampling strategies include:
1. Accept/reject
2. Metropolis-Hasting

In the accept-reject strategy, the space of projections B is sampled uniformly. If the sampled distribution does not satisfy the constraint, then a new projection is generated until acceptance is achieved. This works well only for small dimensional spaces (in practice, for values of d which are smaller than 10).

For higher dimensions, the Metropolis Hasting algorithm is a more applicable method: This method starts with the selection of an initial projection $\beta_0$ satisfying the constraints. Then, iterate the algorithm for indices τ=0, 1, 2, 3, ..., as follows:

1. Generate a new projection $\tilde{\beta}$ using a proposed distribution $q(\tilde{\beta}|\beta_\tau)$. In one embodiment a Gaussian distribution is used for q, with mean $\beta_\tau$ and covariance $\sigma^2$;
2. Sample a uniform random scalar variable u between zero and one.
3. If $u < \Pi_{l=1}^{L} c_l(\Pi(X,\tilde{\beta}))$ then $\beta_{\tau+1}=\tilde{\beta}$
4. Otherwise, $\beta_{\tau+1}=\beta_\tau$ In the case of hard constraints, this procedure is guaranteed to sample the space S uniformly over the space. The value of $\sigma^2$ may be chosen adaptively to have a predetermined acceptance rate, e.g., of approximately 25%.

2. One-Dimensional Approximation (S104)

In the second step of the method, a series of projections that approximate the high dimensional data-cloud of N candidate projections by a smoothed segment (curve) is computed.

A useful method for low dimensional approximation of grid-like non-linear smoothed functions is the Self-Organizing Map (SOM) (See KOHONEN, T. *Self-organizing maps*. Springer, Berlin, (1995)). In the exemplary embodiment, a probabilistic variant of SOMs, referred to as the Bayesian Self Organizing Map algorithm (BSOM), also known as Generative Topographic Mapping (GTM), may be used (See UTSUGI, A. Hyperparameter selection for self-organizing maps. *Neural Computation* 9, 3, 623-635 (1997); and BISHOP, C. M., SVENSEN, M., AND WILLIAMS, C. K. I. GTM: The generative topographic mapping. *Neural Computation* 10, 1 pp. 215-234 (1998)). BSOMs are Gaussian mixture models with constrained centroid parameters. In its simplest form, the mixture model has spherical components with a common variance and has an identical weight.

Based on the set of projections $\beta_1, \ldots, \beta_N$, identified at S102, the BSOM objective is to satisfy the objective function:

$$\gamma(\mu) = \sum_{i=1}^{N} \log \sum_{t=1}^{T} e^{-\frac{\lambda}{2}\|\beta_i - \mu_t\|^2} db + \frac{\alpha}{2} \sum_{t=2}^{T-1} (\mu_{t-1} - 2\mu_t + \mu_{t+1}),$$ Eqn. (1)

where: T represents the number of centroids on the smoothed curve (a fixed parameter, which may be, for example from about 10 to 1000 or more, e.g., about 100 for ease of computation);

$\mu_t$ are the centroid mean locations;

$\lambda$ is a learned parameter and is the inverse variance of the centroids (using the exponential of the negative value in the first term allows for optimization by maximization of the value, rather than minimization). If $\lambda$ is large the expression considers points which are relatively far from the curve; and $\alpha$ is a weighting factor. The value of $\alpha$ is set manually to tradeoff smoothness and data point closeness in the objective Eqn. (1). The value of $\alpha$ can be, for example, $0<\alpha<\infty$. The closer $\alpha$ is to $\infty$, the closer the curve is required to be to a straight line.

The optimal values of $\lambda$ and $\mu_t$ are learned using Expectation Maximization (EM). As noted above, the first term of the BSOM objective function is a function of the covering of the space, taking into account the user preferences. It aims to optimize the proximity of the data-points to the closest centroid on the curve (See FIG. 3). The curve has a fixed number of centroids spaced along its length. The quantity $\beta_i - \mu_t$ represents the distance between a given projection (as represented by a data point) from the set of candidate projections and the closest centroid $\mu_t$. The second term (after +) aims to optimize the smoothness. In the exemplary function this is done by considering, for each three successive centroids: $\mu_{t-1}$, $\mu_t$, and $\mu_{t+1}$, how close these points are aligned to a straight line.

The EM algorithm provides a general approach to learning in the presence of unobservable variables. In the present case, the hidden variables are the assignment of the data-points to the clusters (defined by their centroids). This algorithm begins with an arbitrary initial hypothesis and then repeatedly calculates the expected values of the hidden variables (assuming the current hypothesis is correct) (Estimation), and then update the parameters based on the expectations over the hidden variables (Maximization). This procedure converges to a local maximum likelihood.

FIG. 3 is an exemplary Bayesian Self-Organizing Map which can be generated during the exemplary method. Datapoints. corresponding to projections in higher dimensional datasets, are illustrated by dots 40. In the example, for ease of illustration, a set of 2 dimensional data is used. The data is approximated by a 1-dimensional smoothed curve 42. The smoothed curve 42 has a beginning at 44 and end at 46. Spaced along the curve are centroids 48. In the AGT method, the centroids are the set of projections that will be used to build the 2D smooth animation. BSOM allows a non-redundant and sequential set of projections to be obtained. Additional projections for the animation can be obtained by interpolation between adjacent centroids. As can be seen in FIG. 3, areas shown generally as A and B, which represent the least interesting projections, are spaced from the curve 42 and are typically under-represented in the sequence of projections which form the animation.

Figure 4:
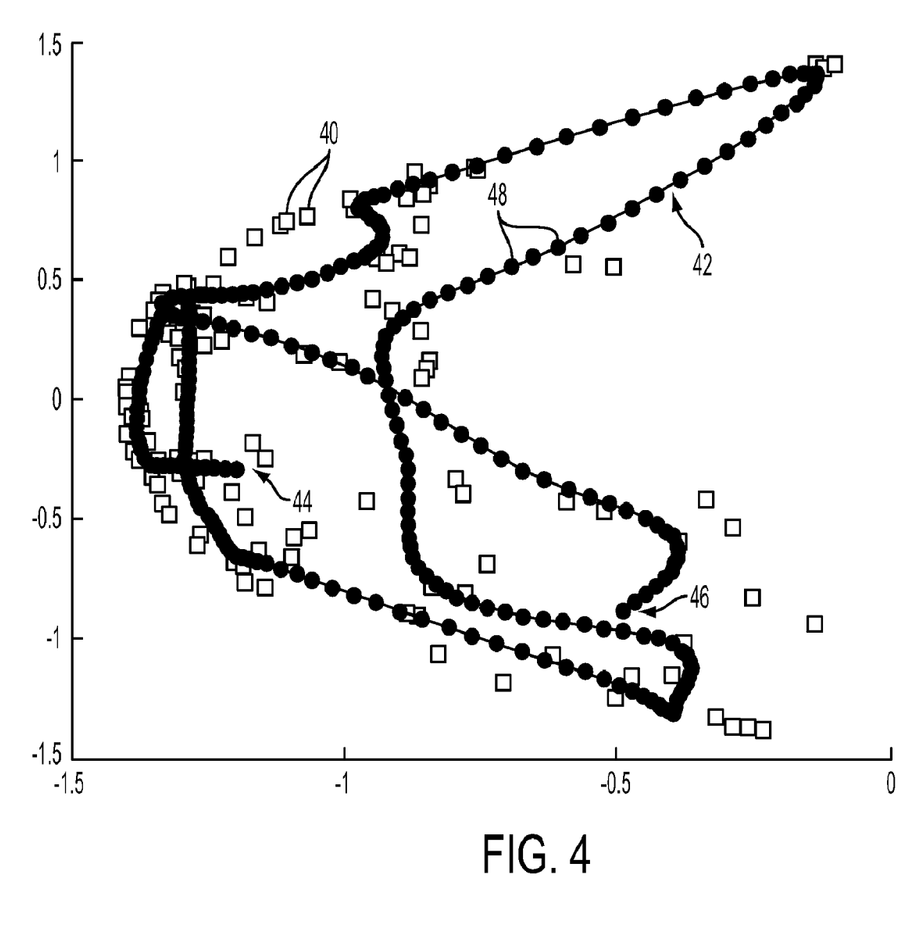
FIG. 4 illustrates a smooth curve on a dataset.

An example of a solution obtained in the AGT framework using a multi-dimensional data-set is shown in FIG. 4. As for FIG. 3, the data is approximated by a 1-dimensional smoothed curve 42. It can be seen that there are more cluster centroids (the circles) where the density of projections (the squares) is high. Also the global coverage of the candidate projections is reasonable. It will be appreciated that, although the curve 42 appears to pass through the same point in space more than once, this is an artifact of the two dimensional representation. As for FIG. 3, the curve has a beginning 44 and end 46 with centroids 48 spaced along the curve and never passes through the same point in the multidimensional space more than once.

3. Creation of the Animation (S106)

The curve 42 obtained from the previous step is a piecewise linear curve and is used to select the projections for the animation. Each selected projection can correspond to one video frame. For example, a given number M of projections is computed by splitting the curve into in M segments. The mean of each of these segments corresponds to a projection that is applied to every data-point to obtain the data-set to obtain a low-dimensional plot. For example, if M is equal to the number of centroids, then there is one image computed for every centroid of the curve. M can be more than the number of centroids, by interpolating between them.

The segments M may be equally spaced along the curve. An image is generated for each projection (there is one projection for every segment) using image rendering software (which may form a part of the DVC). The set of the generated images in the sequence define the movie that can be shown to the user via the display at S108. As for the Grand Tour, the index of the projections is the time dimension. For improved visualization, colors can be used to distinguish labeled and unlabelled data-points, where specific colors corresponding to class labels.

As for the Grand Tour, the space-filling curve is used in the projection space to provide a series of projections for which, for every possible projection, the series contains at least one element in a small neighborhood, and the sequence of projection is smooth, so that two contiguous projections in the series give similar images. However, unlike the Grand Tour, the method does not require that the entire space of the data set be sampled by the projections.

4. Extensions of the Exemplary Method

4.1 Interactivity

The Adaptive Grand Tour method thus described may be useful as an interactive tool to visualize quickly complex and multidimensional datasets. The user can guide the generation of the final animation either by annotating items or by adding new constraints. Users work directly on data-points with the current projection. For example, a first animation is generated by the method described above. The user views the animation and selects an interesting projection to work on. The user may examine a data point and manually label it. The label then becomes a constraint, which influences the generation of the animation when the method is repeated. Of course, a user may decide to label several or all data-points in a selected projection or projections before repeating the method. As a simple example, a user may label some data-points as "cats" and others as "dogs" based on a review of images corresponding to the data-points. An automated learning system (not shown) can be trained on the labeled data-points to label other data-points automatically, based on the similarity of their features. The projection helps the user to identify the best data-points to label for training the system. (See, for, example, U.S. patent application Ser. No. 12/080,414, filed Apr. 2, 2008, entitled MODEL UNCERTAINTY VISUALIZATION FOR ACTIVE LEARNING, by Loïc Lecerf, the disclosure of which is incorporated in its entirety by reference).

The annotation may be the data class label, but a user can also define specific annotations in order to guide the AGT according to his interest. With the generic constraints alternative, the user may use another kind of guidance. A constraint may be expressed in terms of a minimal or maximal distance between two or several selected items.

The overall method tends to favor retaining projections in which data-points from the same cluster are close to each other. A user stops the animation when he finds an interesting projection. He can then add or remove constraints and/or labels and launch a new animation. This iterative process is a powerful tool for exploring and discovering interesting clusters or structure in a dataset.

The interaction with the user occurs once the movie is visualized: some data-points are selected and annotated into categories. The annotations are used to generate a new movie. The current animation may be stopped at anytime and annotation may be removed or refined in order to have a better insight into a specific part of the dataset.

4.2 Non-Linear Projections

The exemplary method has been described in terms of only linear projections of the data. It is possible to extend the approach to non-linear projections by replacing the n×d data matrix (n is the number of points, d the number of dimensions) by a n×n Kernel matrix with entries $K(x_i, x_j)$ where K is a Kernel function.

Without intending to limit the scope of the exemplary embodiment, the following examples demonstrate the applicability of the method to existing multidimensional datasets.

5. Examples

Three data sets of the standard UCI collection were used for testing the method: Iris; Lymph, and Segment (See D. J. NEWMAN, S. HETTICH, C. B., AND MERZ, C. UCI repository of machine learning databases, 1998, for a description of these data sets).

Movies were prepared to compare the different modes of AGT described in sections 1.1 and 1.2 above and show the advantages of taking into account the labels of annotated items. For initial tests, a set of twenty items (represented by data-points) were used and the AGT was generated with the semi-supervised mode and unsupervised mode. Random annotations were used to simulate the user guidance. For improved visualization, colors are used to distinguish labeled and unlabelled data-points, with specific colors corresponding to class labels (For ease of illustration in monochrome, different shapes are used for the data-points).

In the supervised mode, the twenty labeled data-points were used to adapt the Grand Tour to user interest. FLD was used to find an optimal 2D projection of each neighborhood. The K-Neighborhood of an item is the nearest labeled item for each class c plus the K-c nearest items.

In the unsupervised mode PCA was used instead of FLD for the projections generation. It could be seen by examinations of the animations that semi-supervised AGT focused the dynamic visualization on user interest. For each projection of the movies, the labeled data-points are as far as possible. In the other hand, unsupervised AGT gives a broader overview of the dataset.

Figure 5:
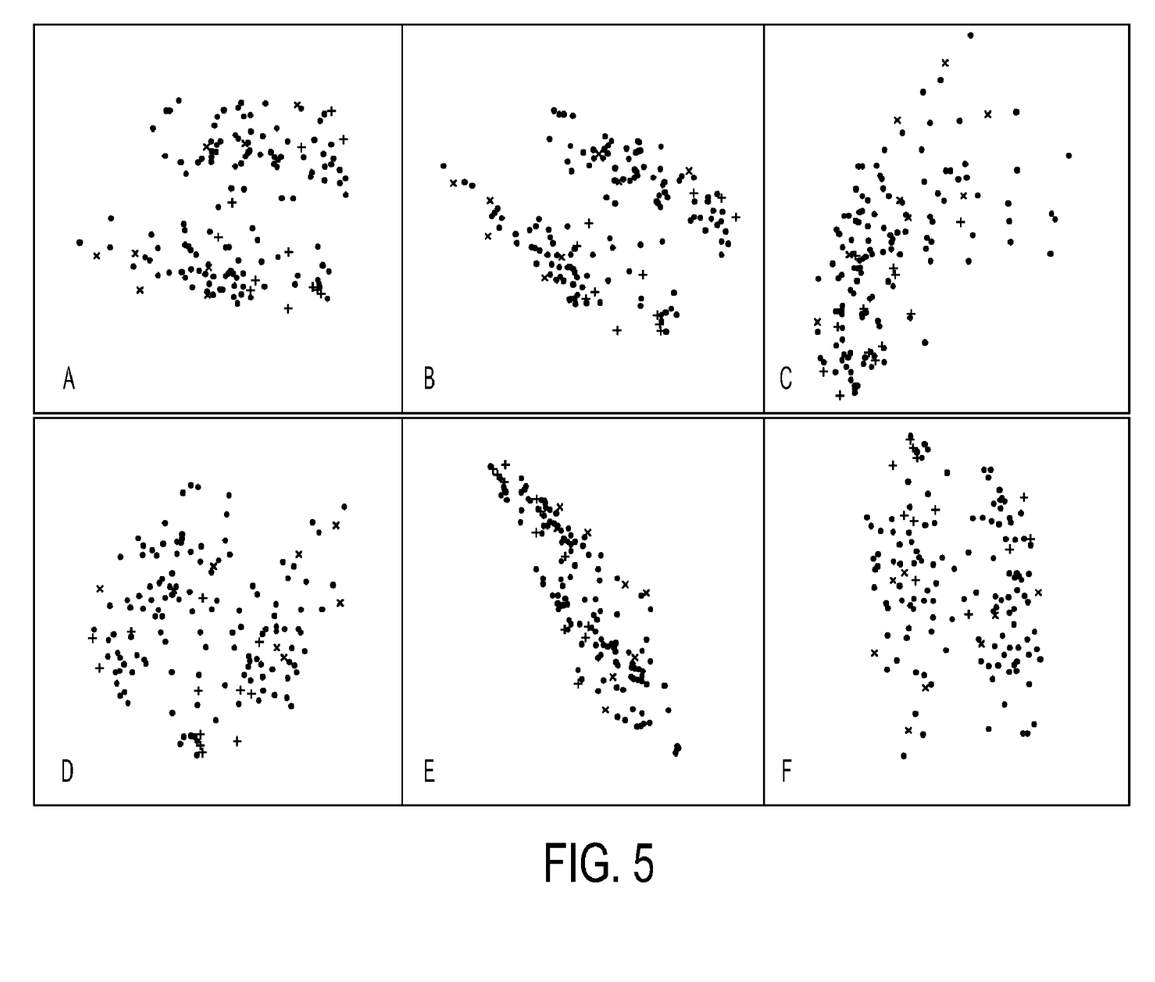
Figure 6:
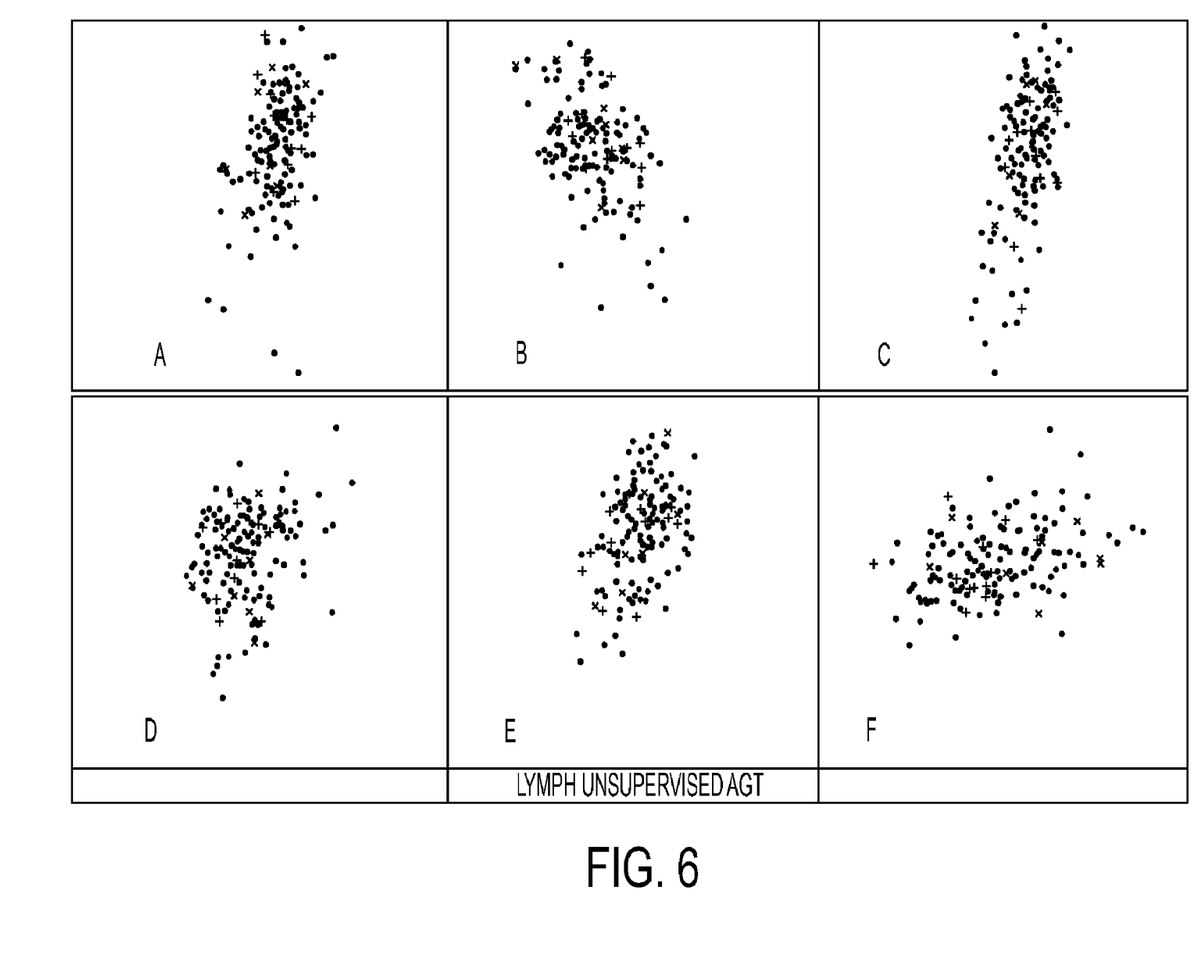

FIGS. 5 and 6 show screen shots of AGT with the Lymph dataset. Data-points shown as dots represent non annotated items. Labeled data-points are marked with an x or + according to their classes. FIGS. 5A-F arose from application of the semi-supervised AGT method. FIGS. 6A-F arose from application of the unsupervised AGT method.

As previously noted, Metropolis-Hasting is an alternative method for the generation of good projections. In the animations generated with this method, 2 pairs of data-points were chosen randomly and the AGT generated. The valid projections correspond to the set of projected datasets such that the distance between every pair of labeled data-points in different (same) clusters is greater (smaller) than a pre-specified threshold (which was set to 25% of the dataset diameter). This complex space was then sampled with the Metropolis Hasting method.

In the videos, it could be seen that the AGT is restricted in order to respect the constraints.

In the case of Non-linear projections, the original projections were mapped into a higher-dimensional space. A Gaussian kernel transformation was applied. Thus an AGT was built on transformed data.

In summary, the exemplary system and method has several advantages over existing methods.

It allows the exploration of high dimensional data, by a set of continuous 2D projections that try to fill the space of every possible projection. In contrast, standard data visualization methods reduce the dimension to display a static view of the data, resulting in a loss of information.

In the interactive approaches of the exemplary method, the user is allowed to work directly on data-points rather than on parameters. This is a very intuitive way to guide the exploration process.

Some methods are based on a view that is optimal for a certain criterion (e.g., PCA minimizes the Euclidian projection error). With the exemplary method, a video sequence can be guided by the user's intuitions rather than a fixed criterion.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating a dynamic visualization of a multi-dimensional dataset comprising:
with a computer processor:
generating a set of candidate projections from the space of all possible projections for a multi-dimensional set of data-points, based on the multi-dimensional dataset; and
approximating the set of candidate projections with a one dimensional smoothed curve obtained by optimizing a function that depends on a first term and a second term, the first term taking into account a proximity of the candidate projections to the one dimensional smoothed curve, the second term favoring smoothness of the one dimensional smoothed curve; and
generating the dynamic visualization based on a sequence of projections taken along the smoothed curve.

2. The method of claim 1, wherein the generating a set of candidate projections includes sampling the possible projections to identify a set of projections expected to be of interest to a user.

3. The method of claim 1, wherein the generating of the set of candidate projections comprises generating constraints based on user input and generating the set of candidate projections based at least in part on the user-based constraints.

4. The method of claim 3, wherein projections from the space of projections are sampled, based on a Metropolis Hasting algorithm, to identify a distribution of candidate projections which take into consideration the constraints.

5. The method of claim 1, wherein the generating of the set of candidate projections comprises local linear embedding which for each of the data-points, identifies a single projection for a neighborhood comprising the data-point and its nearest neighbors.

6. The method of claim 5, wherein the identification of the linear projection also takes into account any labels applied to the data-points in the neighborhood.

7. The method of claim 1, wherein the approximating of the finite set of projections with the one dimensional smoothed curve includes defining a number of centroids which, in sequence, are to form the smoothed curve, and optimizing an objective function which includes a first term which takes into account the distance of each candidate projection from its nearest centroid and a second term which favors smoothness of the curve.

8. The method of claim 7, wherein the objective function is optimized by expectation maximization.

9. The method of claim 7, wherein the objective function includes a weighting factor which is selectable to influence the respective importance of the first and second terms in the optimization.

10. The method of claim 7, wherein there are at least 10 centroids.

11. The method of claim 7, wherein the generating of the dynamic visualization includes generating a sequence of projections which includes projections at the centroids and optionally projections identified by interpolation between pairs of centroids.

12. The method of claim 1, wherein the projections are linear projections.

13. The method of claim 1, wherein the projections are 2 dimensional projections.

14. The method of claim 1, further comprising displaying the dynamic visualization on a display.

15. The method of claim 14, further comprising receiving labels applied by a user to data-points while viewing the dynamic visualization on the display and generating a new dynamic visualization based on constraints derived from the labels.

16. A computer program product comprising a non-transitory computer readable storage medium which encodes instructions, which, when implemented by a computer, perform the method of claim 1.

17. A dynamic visualization of a dataset generated by the method of claim 1.

18. A computer system comprising:
memory which stores a dynamic visualization component which includes instructions for performing the method of claim 1; and
a processor, communicatively linked with the memory for executing the instructions.

19. The system of claim 18, further comprising memory which stores the data set in communication with the processor.

20. The system of claim 18, further comprising a display communicatively linked with the processor, which is caused to display the animation.

21. A computer-implemented method for adaptively generating a dynamic visualization of a dataset having more than three dimensions comprising:
receiving first constraints input by a user;
based on the first constraints, identifying a set of candidate linear projections as a subset of the dataset;
with a computer processor, approximating the set of candidate linear projections as a smoothed one dimensional curve;
automatically generating a dynamic visualization based on a sequence of projections taken along the smoothed curve; and
after the generating of the dynamic visualization, receiving second constraints input by a user and generating a new dynamic visualization based on the received first and second user-input constraints.

22. An automated method for assisting a user in labeling data points of a dataset comprising:
generating a dynamic visualization of a dataset based on a sequence of projections, each projection comprising at least one data-point from the dataset;
receiving labels applied by a user to data-points displayed in the dynamic visualization;
based on the labels, generating constraints;
based on the constraints, identifying a set of candidate linear projections for the dataset;
with a computer processor, approximating the set of candidate linear projections as a smoothed one dimensional curve obtained by optimizing a function that depends on a first term and a second term, the first term taking into account a proximity of the candidate projections to the one dimensional smoothed curve, the second term favoring smoothness of the one dimensional smoothed curve; and generating a new dynamic visualization based on a sequence of projections taken along the smoothed curve.

23. A computer program product comprising a non-transitory computer readable storage medium which encodes instructions, which, when implemented by a computer, perform the method of claim 21.

24. A computer program product comprising a non-transitory computer readable storage medium which encodes instructions, which, when implemented by a computer, perform the method of claim 22.

25. A method of generating a dynamic visualization of a multi-dimensional dataset comprising:

generating a set of candidate projections from the space of all possible projections for a multi-dimensional set of data-points, based on the multi-dimensional dataset;

with a computer processor, approximating the set of candidate projections with a one dimensional smoothed curve, the generating of the set of candidate projections comprising local linear embedding which for each of the data-points, identifies a single projection for a neighborhood comprising the data-point and its nearest neighbors; and generating the dynamic visualization based on a sequence of projections taken along the smoothed curve.

26. A computer program product comprising a non-transitory computer readable storage medium which encodes instructions, which, when implemented by a computer, perform the method of claim 25.

* * * * *